Nov. 6, 1923.                    1,473,289
W. GREEN
PROCESS OF MAKING A FOOD PRODUCT
Filed Jan. 25, 1922
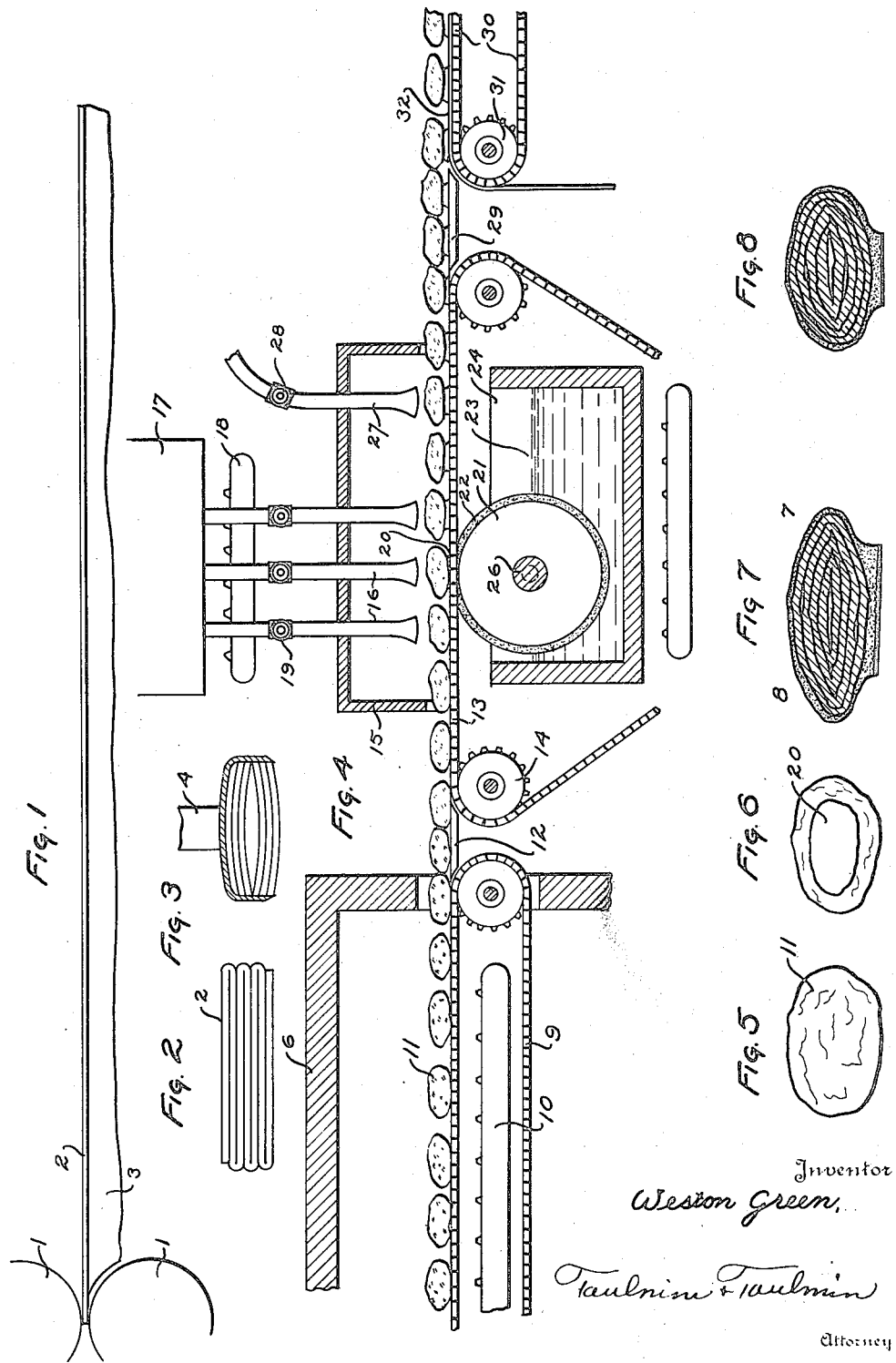

Patented Nov. 6, 1923.

1,473,289

UNITED STATES PATENT OFFICE.

WESTON GREEN, OF DAYTON, OHIO, ASSIGNOR TO THE GREEN & GREEN COMPANY, OF DAYTON, OHIO, A CORPORATION OF OHIO.

PROCESS OF MAKING A FOOD PRODUCT.

Application filed January 25, 1922. Serial No. 531,713.

*To all whom it may concern:*

Be it known that I, WESTON GREEN, a citizen of the United States, residing at Dayton, in the county of Montgomery and State of Ohio, have invented certain new and useful Improvements in a Process of Making a Food Product, of which the following is a specification, reference being had therein to the accompanying drawing.

My invention relates to a food product and in particular to the process of making it.

The object of my invention is to provide a process for making a new article of consumption consisting of a cracker having a coating thereon. It is my object to provide a process for making a cracker with a chocolate coating thereon.

It is a further object to provide a process for making a cracker having a plurality of layers separated from one another to some degree by air spaces.

It is my object to provide a process for making a cracker that is crimped at the edges. It is an object of my invention to provide a process for making a cracker that is formed in the shape of an almond.

It is my object to provide a process for making a cracker that when coated will be provided with an air tight coating and a foot on the bottom thereof so that the cracker will remain stationary in a given location when placed upon a surface.

It is an object of my process to be able to rapidly and economically produce crackers coated with a suitable material. It is my object to provide a process susceptible of producing such crackers in quantities continuously without being touched by human hands.

Referring to the drawings:

Fig. 1 is a diagrammatic view of a strip of dough, the rollers and table for supporting the dough.

Fig. 2 is a side elevation of the dough layers folded one upon the other.

Fig. 3 is a section of a cutter to form the individual cracker.

Fig. 4 is a side elevation partially in section of the apparatus employed in the process for baking and coating the cracker.

Fig. 5 is a top plan view of the completed almond-shaped coated cracker.

Fig. 6 is a bottom plan view of the coated cracker showing the foot on the bottom of the cracker.

Fig. 7 is a section on the major axis of the cracker.

Fig. 8 is a transverse section of the cracker.

Referring in detail to the drawings, 1—1 are rolls between which the kneaded dough for the crackers has passed. The dough is shown at 2 resting upon the table 3. This dough is folded upon itself, preferably in seven layers as shown in Fig. 2. Any suitable means of folding the dough may be employed.

A plurality of cutters 4 are brought in contact with the seven layers of dough and the individual crackers, preferably almond-shaped, are cut from the dough sheet. As these sheets of dough are laid upon one another lightly and are entirely separate from one another, and as the dough is thoroughly aerated, there are a number of air spaces both within the dough and continuous air spaces between each leyer. The cutting operation, it will be apparent, only seals the dough at its edges. That is, the several layers will be crimped around the edges but will not be forced together anywhere else in the cracker. The cutter is somewhat irregular in shape so that the general configuration or outline of an almond is given to the exterior of each cracker. One of the air spaces is shown at 5. When the cracker is baked in the oven 6 a number of interstices or air spaces will be found between each layer as at 7 and 8 in Figures 7 and 8, showing the completed cracker.

The crackers composed of these various layers with air spaces between them are put upon an endless belt and conveyed through an oven 6. This belt is shown at 9 passing over the burners 10. This is simply a conventional illustration and any desired form of burner or oven may be employed. The baked crackers 11 proceed outwardly upon the platform 12 and thence upon the endless belt 13 that is driven by the sprocket wheels 14. This endless belt which is composed of a wire netting passes into the hood 15. The baked crackers pass beneath the sprays 16 from which heated chocolate is forced or drips. This chocolate is supplied from a tank 17. The chocolate in the tank is kept heated by the burners 18. The flow of chocolate is controlled by the valves 19.

The sprays 16 will put a top coating upon the crackers but something more is necessary to put a coating on the bottom of the cracker and to put an accumulation of the coating to form a foot 20. This foot may be put on in any desired way but I have shown one preferred form in the drawing. This form consists of a wheel 21 with a band on its periphery 22 of any soft material for picking up the chocolate 23 which is contained in the tank 24 heated by the burner 25, and conveying this chocolate up against the bottom of the endless wire belt squeezing it onto the bottom of the crackers.

Another form, not shown, might readily be the movement of these crackers along the surface of a chocolate bath or by having another wire belt that has been dipped in chocolate pass in the opposite direction adjacent and beneath the first wire belt. The mechanism is immaterial so long as the process is practiced. This wheel 21 is supported on a shaft 26 in the sides of the tank and may be either positively revolved or allowed to revolve by reason of the friction of the chain belt 13 on its periphery.

The crackers may be coated with any desired substance, and I have simply used chocolate as one of the preferred substances but I do not wish to confine my process or article solely to chocolate.

In order to remove any surplus of the coating, I have provided a cold air hose 27 controlled by the valve 28 which blows off any surplus coating so that it drops into the tank 24 and is not lost. The completed food product passes out of the oven 15 onto a table 29 where the food products push one another across the table onto an endless belt 30. Upon the endless belt 30 actuated by the sprocket 31 is passed a sheet of waxed paper 32 to the surface of which the food products are delivered and upon which they are allowed to cool. They are then removed from the waxed paper and packed in suitable containers.

The result of the foregoing will be seen in Figures 5, 6, 7 and 8. I can produce any desired form or configuration, but I prefer the form in an almond-shaped chocolate coated food product of somewhat irregular surface and irregular outline. This product can be readily packed and will not roll about in the package when packed, thereby breaking its coating by reason of the fact that it has the foot 20 upon the base thereof forming a flat surface to prevent movement of the small food product in its container. It also serves as a means of giving a uniform appearance to each one of the food products and assists in the manufacture as each food product is retained in its proper place during the course of the manufacture thereof.

The coating seals the freshly baked dough and preserves its freshness and moisture so that this food product will keep its original freshness over a longer period of time thus allowing it to be shipped at great distances. Customarily, I prefer to confine the coating to a rather thin one in order that there will be little possibility of the coating melting in hot weather and the various products sticking to one another.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:

1. In a process of manufacturing a food product, rolling dough into a strip, folding the dough strip upon itself a plurality of times, cutting out the dough strip in a desired configuration, and baking said plurality of strips so cut out as a unit.

2. In a process of manufacturing a food product, rolling dough into a strip, folding the dough strip upon itself a plurality of times, cutting out the dough strip in a desired configuration, baking said plurality of strips so cut out as a unit, and coating with a confectionery product the exterior of said baked layers of dough.

3. In a process of manufacturing a food product, rolling dough into a strip, folding the dough strip upon itself a plurality of times, cutting out the dough strip in a desired configuration, baking said plurality of strips so cut out as a unit, coating with a confectionery product the exterior of said baked layers of dough, and removing the surplus coating therefrom and cooling the finished product.

4. In a process of manufacturing a food product, rolling dough into a strip, folding the dough strip upon itself a plurality of times, cutting out the dough strip in a desired configuration, baking said plurality of strips so cut out as a unit, coating with a confectionery product the exterior of said baked layers of dough, and forming a surplus layer of coating on the bottom of said product so that said surplus portion will have a substantially level exterior surface.

5. In a process of manufacturing a food product, rolling dough into a strip, folding the dough strip upon itself a plurality of times, cutting out the dough strip in a desired configuration, baking said plurality of strips so cut out as a unit, coating with a confectionery product the exterior of said baked layers of dough, forming a surplus layer of coating on the bottom of said product so that said surplus portion will have a substantially level exterior surface, and removing the surplus coating from said product.

6. In a process of producing a food product, the formation of a layer of dough, bending the dough back upon itself a plurality of times, cutting a plurality of said adjacent layers of dough into a desired configuration leaving air spaces between said layers with the exception of the portions at the edges thereof which are crimped together, baking said cut out portions, and coating said cut out portions with a confectionery coating.

7. In a process of producing a food product, the formation of a layer of dough, bending the dough back upon itself a plurality of times, cutting a plurality of said adjacent layers of dough into a desired configuration, leaving air spaces between said layers with the exception of the portions at the edges thereof which are crimped together, baking said cut out portions, coating said cut out portions with a confectionery coating, and forming a level area on the exterior of said article, said level area being composed of a confection.

8. In a process of producing a food product, the formation of a layer of dough, bending the dough back upon itself a plurality of times, cutting a plurality of said adjacent layers of dough into a desired configuration, leaving air spaces between said layers with the exception of the portions at the edges thereof which are crimped together, baking said cut out portions, coating said cut out portions with a confectionery coating, forming a level area on the exterior of said article, said level area being composed of a confection, and removing the surplus confectionery coating.

9. In a process of producing a food product, the formation of a layer of dough, bending the dough back upon itself a plurality of times, cutting a plurality of said adjacent layers of dough into a desired configuration, leaving air spaces between said layers with the exception of the portions at the edges thereof which are crimped together, baking said cut out portions, coating said cut out portions with a confectionery coating, forming a level area on the exterior of said article, said level area being composed of a confection, removing the surplus confectionery coating, and cooling the completed article.

In testimony whereof, I affix my signature.

WESTON GREEN.